US007774914B2

(12) United States Patent
Womack

(10) Patent No.: US 7,774,914 B2
(45) Date of Patent: Aug. 17, 2010

(54) METHOD FOR STABILIZING A COMPRESSION HEAD

(76) Inventor: Johnny Womack, 3232 Fortner La., Moody, AL (US) 35004

( * ) Notice: Subject to any disclaimer, the term of this patent is extended or adjusted under 35 U.S.C. 154(b) by 952 days.

(21) Appl. No.: 11/557,565

(22) Filed: Nov. 8, 2006

(65) Prior Publication Data

US 2007/0122518 A1 May 31, 2007

Related U.S. Application Data

(62) Division of application No. 10/936,350, filed on Sep. 8, 2004, now Pat. No. 7,217,118.

(51) Int. Cl.
*B23P 11/00* (2006.01)
*B28B 3/04* (2006.01)

(52) U.S. Cl. ...................... 29/428; 29/525.01; 425/412; 248/637

(58) Field of Classification Search .................. 29/428, 29/525.01, 525.02; 425/412, 415, 423, 451.9; 249/190, 211; 248/638, 637, 694
See application file for complete search history.

(56) References Cited

U.S. PATENT DOCUMENTS

| | | | | |
|---|---|---|---|---|
| 3,297,284 | A * | 1/1967 | Pellerin | 248/550 |
| 3,548,454 | A | 12/1970 | Kallengerger et al. | |
| 4,515,544 | A | 5/1985 | Boehm et al. | |
| 4,589,830 | A | 5/1986 | Clawson | |
| 4,834,558 | A | 5/1989 | Morse | |
| 5,240,032 | A * | 8/1993 | Mizioch | 137/368 |
| 6,164,947 | A | 12/2000 | Miyahara | |
| 6,210,144 | B1 * | 4/2001 | Mailliet et al. | 425/150 |

* cited by examiner

*Primary Examiner*—Jermie E Cozart
(74) *Attorney, Agent, or Firm*—C. Brandon Browning; Maynard, Cooper & Gale, PC

(57) ABSTRACT

A stabilizer kit for a compression head of a concrete block machine is provided, the kit including a stabilizer plate, a fiber disc, a stud, a pair of spacer plates and a set of bolts for attaching the stabilizer plate and a pair of spacer plates to and between an upper portion and a lower portion of a frame of the block machine.

16 Claims, 3 Drawing Sheets

METHOD FOR STABILIZING A COMPRESSION HEAD

The present application is a divisional of U.S. Ser. No. 10/936,350, filed Sep. 8, 2004, now U.S. Pat. No. 7,217,118 B2.

FIELD OF THE INVENTION

This invention relates in general to an apparatus for molding concrete-blocks. More particularly, this invention relates to a compression head stabilizing device for stabilizing a compression head of a concrete block machine.

BACKGROUND OF THE INVENTION

Concrete block machines are used to fabricate concrete blocks, including for example, cinder blocks and keystone pavers. As depicted in FIG. 1, block machines typically include a compression head 16, a mold plunger 18 extending downward from a bottom side of the compression head and a mold box 22 situated below and alignable with the mold plunger. In use, concrete, which typically includes a damp mixture of cement, sand and aggregate, is deposited into the mold box 22 and the compression head pivoted downward bringing the plunger head 18 into engagement with the mold box for compressing the concrete into a style of blocks dictated by the corresponding arrangement of the plunger head and the mold box.

To control the movement of the compression head during its descent, that is, to minimize the amount of lateral or front to back movement of the compression head, the compression head is often associated with a set of guide rails 28. These guide rails are typically located adjacent to each of the four corners of the compression head and in parallel to the axis of descent of the compression head. Utilizing guide brackets 31 attached about the four corners of the compression head, the compression head's lateral and front to back movement is minimized as the guide brackets slideably engage the rails as the compression head descends. However, guide rails alone have proven to be inadequate at decreasing compression head play. Specifically, for example, the amount of undesired movement of the compression head of some existing block machines is approximately ¼ of an inch. In other words, the compression head of one of these machines is allowed to swing laterally and/or front to back a distance of about ¼ of an inch. The variance between the mold plunger and the mold box however can be less than 1/16 of an inch in many of these block machines. Consequently, it is not uncommon for the plunger head to strike the mold box where it was not intended to strike thereby damaging both the plunger head and the mold box, including the mold box end liner and mold box core. Additionally, overtime, the cylinders that actuate the compression head can be so damaged as to require replacement.

OBJECTS AND SUMMARY OF THE INVENTION

It is therefore an object of the invention to provide a device and method for minimizing the lateral movement of a compression head or press.

A further object of the invention is to provide a device and method for minimizing the front-to-back movement of a compression head or press.

A further object of the invention is to provide a kit adapted to fit onto a concrete block fabricating machine for minimizing the lateral movement and/or front to back movement of a compression head of the machine.

A further object of the invention is to provide a device and method for improving the precision of a block machine for locating a mold plunger of a compression head into a mold box.

Another object of the invention is to provide a device and method for decreasing damage to a block machine caused by the imprecise engagement of a mold plunger and mold box of the machine.

The objects of the invention are accomplished by providing a concrete block machine, for example as described in U.S. Pat. Nos. 4,111,627 and 4,795,334, which patent are incorporated herein by reference in their enteritis, including a compression head suspended from a frame, at least one guide rod positioned adjacent to the compression head and a compression head guide member connected with the compression head and arranged to slideably engage the guide rod. For each guide rail, a compression head stabilizer kit including a stabilizing plate, a first spacer member, a second spacer member, a stud and a sliding member are provided whereby the stabilizing plate is positioned substantially parallel to the guide rod, with a portion of the compression head guide member being positioned between the guide rail and the stabilizing plate. The stud is connected with the compression head guide member so that it is positioned between the compression head guide member and the stabilizing plate. The sliding member is then attached to the stud and arranged to slideably engage the stabilizing plate.

Other features, objects and advantages of the present invention will become apparent from a reading of the following description, as well as a study of the appended drawings.

DETAILED DESCRIPTION OF PRESENTLY PREFERRED EMBODIMENTS

Figure 1:
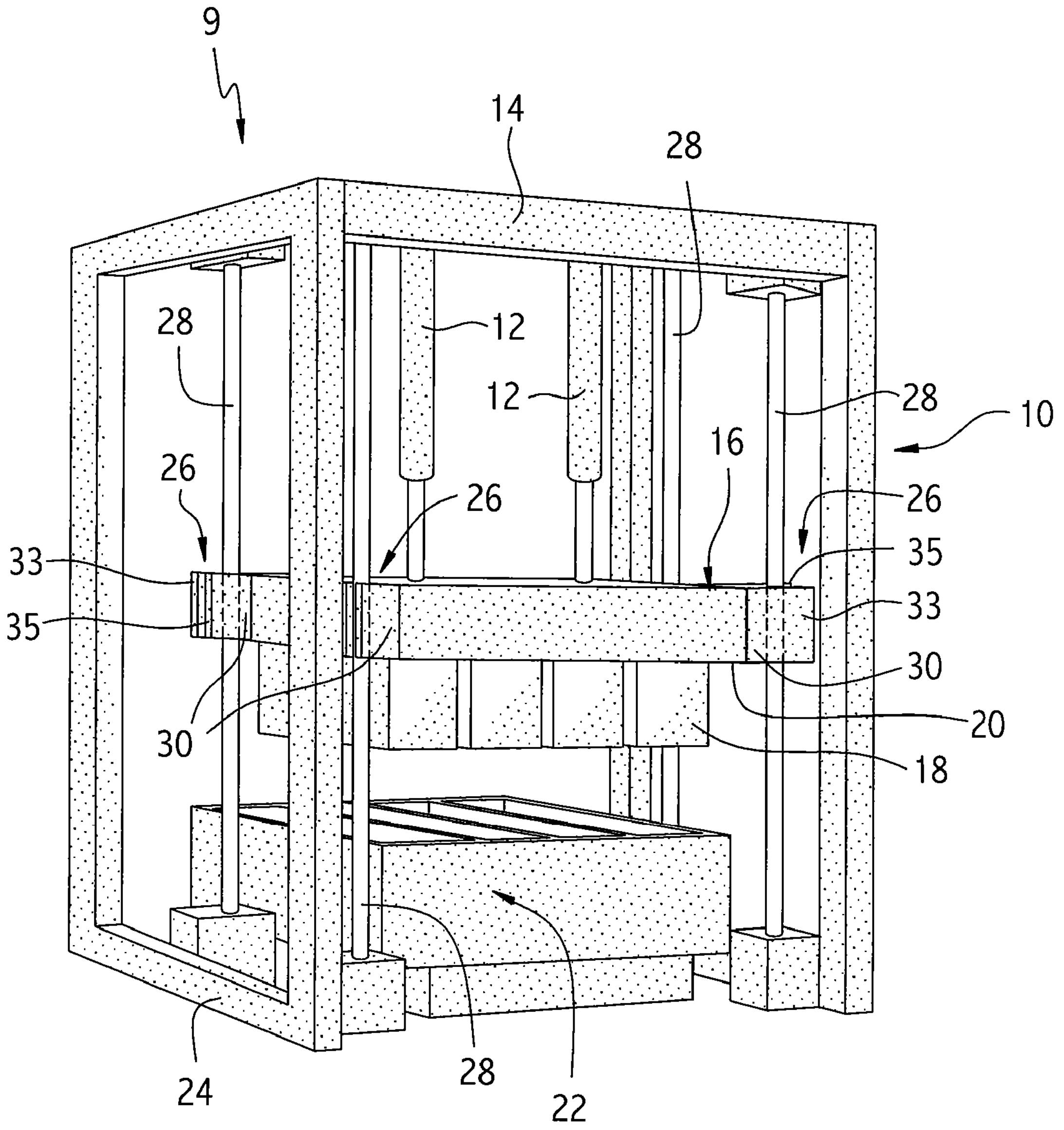
FIG. 1 is a perspective view of a prior art concrete block fabricating machine and a compression head guide assembly therefore.
Figure 2:
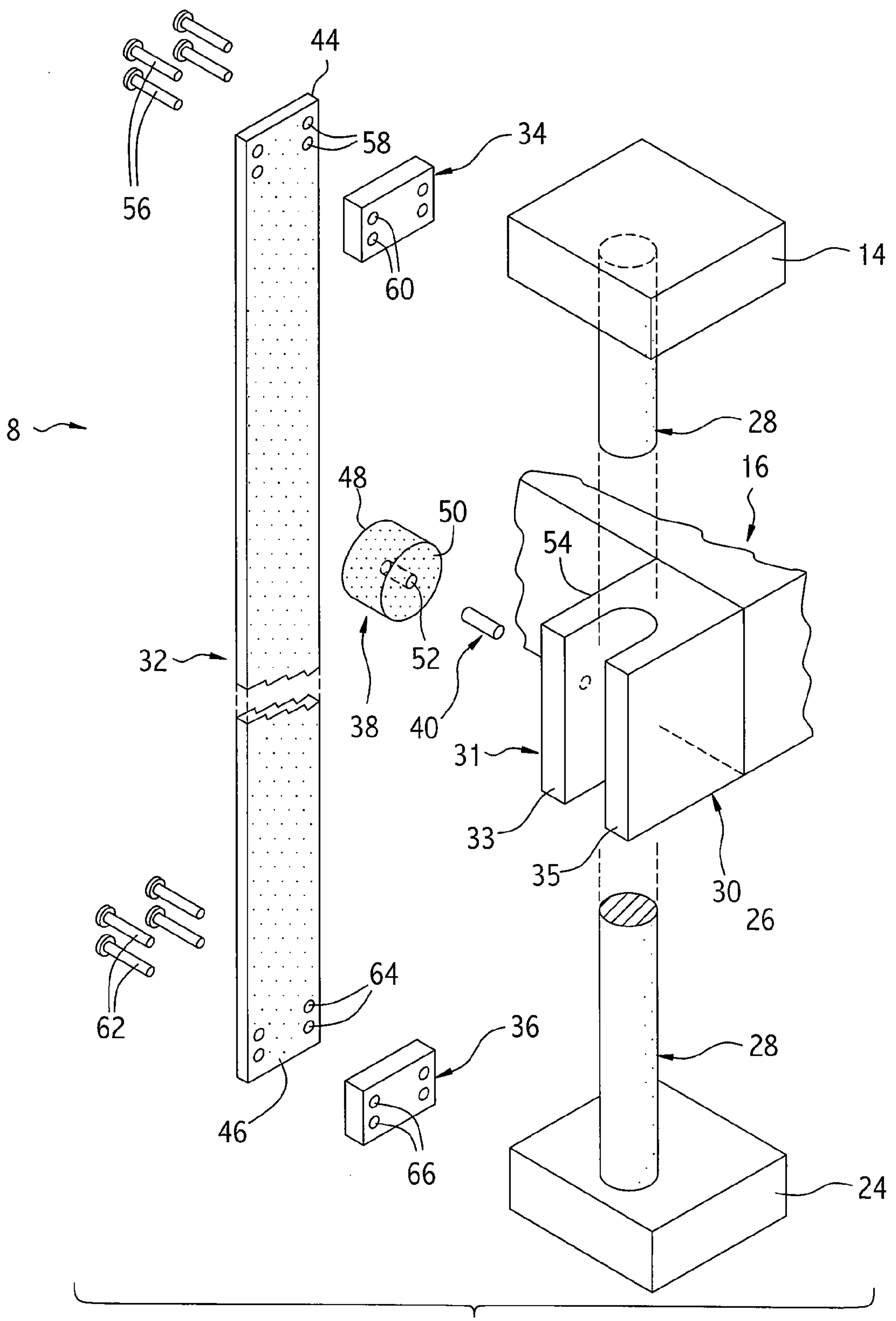
FIG. 2 is an exploded view of the compression head guide assembly of FIG. 1 with a compression head stabilizer, according to the presently preferred embodiment of the invention, fitted thereto.
Figure 3:
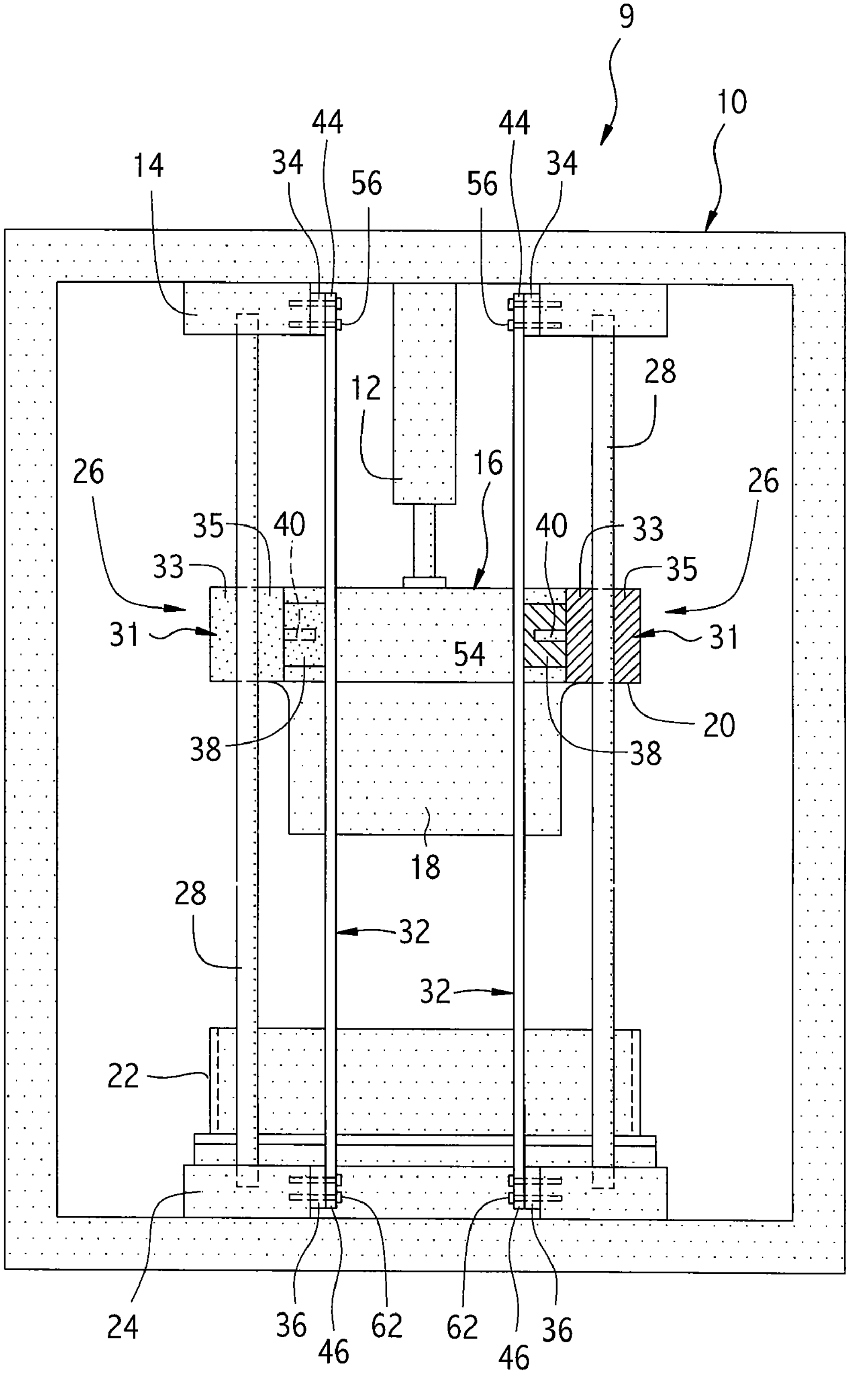
FIG. 3 is a front elevation view of the concrete block fabricating machine of FIG. 2.

A concrete block fabricating machine in accordance with the prior art is illustrated in FIG. 1. A compression head stabilizer kit 8 in accordance with the preferred embodiment of present invention for a compression head of the concrete block machine of FIG. 1 is illustrated in FIGS. 2 and 3, where like portions share like numbering. Referring to FIG. 1, a block machine 9 includes typically a frame 10, a pair of hydraulically actuated cylinders 12 suspended from an upper portion 14 of frame 10, a compression head 16 operatively connected with and actuated by pair of cylinders 12, a mold plunger 18 connected with an underside 20 of compression head 16, a mold box 22 positioned below and in alignment with mold plunger 18 and a set of four compression head guide assemblies 26 for minimizing the lateral and/or front to back movement of compression head 16 when it descends to engage mold plunger 18 with mold box 22. Each guide assembly 26 is composed of a vertical guide rod 28 positioned adjacent to a corner of compression head 16 and a guide arm 30 connected with and extending from compression head 16 for slideably engaging guide rod 28. Guide rod 28 is fixedly supported between upper portion 14 and lower portion 24 of frame 10. Guide arm 30 terminates in an essentially U-shaped bracket 31 having a left arm 33 and a right arm 35. By slideably engaging guide rod 28 at each of the four corners of compression head 16 with U-shaped bracket 31 and between arms 33 and 35, the undesired movement, i.e., lateral movement and/or front to back movement, of compression head 16 is decreased. By supplementing each guide assembly 26 with compression head stabilizer kit 8, the undesired movement can be further reduced.

Referring to FIGS. 2 and 3, compression head stabilizer kit 8 includes the parts necessary to supplement a single one of each of guide assemblies 26, including a stabilizer plate 32, an upper spacer member 34, a lower spacer member 36, a sliding member 38, a stud 40 and a set of eight bolts. Stabilizer plate 32 is constructed of a rectangular steel plate having an upper end 44 and a lower end 46. Stabilizer plate 32 is 1¼ inches thick, 6 inches wide and has a length sufficient to be supported at upper end 44 by upper portion 14 of frame 10 and at lower end 46 by lower portion 24 of frame 10. Each of upper spacer member 34 and lower spacer member 36 is constructed of substantial rectangular, aluminum plate having a thickness of 1½ inches, a width of 2⅞ inches and a length of 6 inches. Sliding member 38 is constructed of a substantially circular fiber disk having a front side 48 and a back side 50 and a diameter of 4 inches. A notch 52 is formed within a central portion of back side 50. Stud 40 is constructed of a steel rod having a length of 1¼ inches and a diameter of ⅝ of an inch. For block machine 9, which includes a set of four guide assemblies 26, four of stabilizer kit 8 are needed to fully benefit from the present invention.

Accordingly, head stabilizer kit 8 is preferably fitted to each one of guide assemblies 26 thereby minimizing the amount of undesired movement of compression head 16 when compression head 16 is pivoted downward for engaging mold plunger 18 into mold box 22. Referring to FIGS. 2 and 3, stud 40 is welded to an outer surface 54 of left arm 33 so that stud 40 is positioned essentially perpendicular to left arm 33. Stud 40 is provided for supporting sliding member 38 on left arm 33. Thus, sliding member 38 is oriented adjacent to stud 40 with notch 52 facing stud 40 and pressed thereon whereby notch 52 stud 40 are connected by an interference fit. With sliding member 38 in place, stabilizer plate 32 is fixed to and between upper portion 14 and lower portion 24 of frame 10.

To fix stabilizer plate 32 to frame 10, upper spacer member 34 and lower spacer member 36 are connected with upper end 44 and lower end 46 of plate 32, respectively. To that end, a first set of four bolts 56, each being 16 mm in length, is inserted through a first set of bolts holes 58 in upper end 44 with the ends of bolts extending therethrough. A second set of bolt holes 60 of upper spacer member 34 is slipped over the set of four bolts 56 so that the ends of bolts 56 also extend therethrough. Likewise, a second set of four bolts 62 is inserted through a third set of bolt holes 64 in lower end 46 of plate 32, and a fourth set of bolts holes 66 of lower spacer member 36 is slipped over the set of four bolts 62 so that the ends of bolts 62 extend therethrough.

With spacer members 34 and 36 connected therewith, stabilizer plate 32 is positioned parallel to guide rod 28 and adjacent to sliding member 38 with upper spacer member 34 being adjacent to upper portion 14 of frame 10 and lower spacer member 36 being adjacent to lower portion 24 of frame 10. Utilizing bolts 56, which extend through upper spacer member, upper end 44 of stabilizer plate 32 is connected with upper portion 14 of frame 10 about the intersection of upper portion 14 with guide rod 28. This accomplished by securing bolts 56 within upper portion 14. Similarly, utilizing bolts 62, which extend through lower spacer member 36, lower end 46 of stabilizer plate 32 is connected with lower portion 16 of frame 10 about the intersection of lower portion 16 and guide rod 26 by securing bolts 62 within lower portion 24. Pursuant to this arrangement, sliding member 38 is sandwiched between stabilizer plate 32 and left arm 33 of bracket 31, and pressure is exerted by stabilizer plate 32 on left arm 33 by pressing sliding member 38 against left arm 33. Consequently, left arm 33 is pinched between guide rod 28 and stabilizer plate 32. This way, movement of U-shaped bracket 31, guide arm 30 and ultimately compression head 16, is limited by the engagement of left arm 33 between stabilizer plate 32 and guide rod 28.

The present invention will be explained further in detail by the following Example.

Example

Stabilizer kit 8 was fitted to each of the four guide assemblies of Tiger Machine Co., Ltd.'s Model PG6 Block Machine after the lateral and front to back movement of the compression head of the machine was observed and measured as the compression head was actuated downward by a pair of hydraulic cylinders. The tolerance between the mold plunger and the mold box of the machine was also measured. It was recorded that the undesired movement of the head as it was actuated downward was ¼ of an inch at the point where the mold plunger began to first engage the mold box. The tolerance between the mold plunger and mold box was observed to be 1/16 of an inch. After stabilizer kit 8 was fitted to each of the four guide assemblies of the machine as described above, the undesired movement of the compression was again measured at the point where the mold plunger first began to engage the mold box. It was observed that the undesired movement of the compression had been decreased to 1/16 of an inch.

As will be apparent to one skilled in the art, various modifications can be made within the scope of the aforesaid description. Such modifications being within the ability of one skilled in the art form a part of the present invention and are embraced by the claims below.

It is claimed:

1. A method of inhibiting damage to a block fabricating machine including a compression head, a plunger assembly and a mold box, the method comprising:

providing a compression head stabilizing kit, the kit including a stabilizing plate, an upper spacer member adapted and arranged for connecting the stabilizing plate with the block fabricating machine, a lower spacer member adapted and arranged for connecting the stabilizing plate with the block fabricating machine, fasteners and a sliding member, and connecting the stabilizing kit with the block fabricating machine utilizing the fasteners so that, when in use, at least one of a lateral or a front-to back movement of the compression head is decreased.

2. The method according to claim 1 wherein the sliding member is connected with a portion of the compression head.

3. The method according to claim 2 wherein the sliding member is connected with a guide arm of the compression head, the guide arm being slideably engaged with a guide rod.

4. The method according to claim 3 wherein the sliding member is arranged between the guide arm and the stabilizing plate.

5. The method according to claim 4 wherein the stabilizing plate is arranged substantially parallel to the guide rod.

6. A method of inhibiting at least one of a lateral movement or a front-to-back movement of a compression head that is suspended from a frame and that includes a compression head guide member connected with the compression head wherein the compression head guide member is arranged to engage a guide rod positioned adjacent to the compression head comprising, providing a compression head stabilizing kit including a stabilizing plate, a first spacer member, a second spacer member, fasteners and a sliding member, coupling the stabilizing plate to the frame using the first spacer member and the second spacer member, coupling the sliding member to the compression head, and slidingly engaging the sliding member and stabilizing plate upon assembly.

7. The method according to claim 6 further comprising fixing the stabilizing plate substantially parallel with the guide rod.

8. The method according to claim 7 further comprising supporting the first spacer member with an upper portion of the frame and supporting the second spacer member with a lower portion of the frame wherein the stabilizing plate is connected to and between the first spacer member and the second spacer member.

9. The method according to claim 7 wherein the compression head guide member is arranged to slideably engage the at least one guide rod.

10. A method for stabilizing a compression head comprising:

rigidly coupling a sliding member with the compression head, and positioning a stabilizing plate substantially parallel to a compression head guide rod and coupling the stabilizing plate to a frame on which the compression head is supported, wherein the sliding member is adapted and arranged for slideably engaging the stabilizing plate and the compression head is adapted and arranged for slideably engaging with the compression head guide rod, and wherein the stabilizing plate is rigidly coupled to the frame by spacer members.

11. The method according to claim 10 further comprising engaging a mold plunger supported by the compression head with a mold box for preparing blocks.

12. The method according to claim 10 wherein the compression head includes a compression head guide member for rigidly coupling the sliding member with the compression head, the compression head guide member being adapted and arranged for slideably engaging the compression head guide rod.

13. The method according to claim 12 further comprising positioning at least a portion of the compression head guide member between the compression head guide rod and the stabilizing plate.

14. The method according to claim 12 wherein the compression head guide member includes a first arm, a second arm and a curved portion connected between the first arm and the second arm.

15. The method according to claim 10 further comprising rigidly coupling the stabilizing plate to a frame on which the compression head is supported.

16. The method according to claim 15 wherein the sliding member, the stabilizing plate and the one or more spacer members are provided in a kit.

* * * * *